(12) United States Patent
Gaylord et al.

(10) Patent No.: US 6,606,432 B2
(45) Date of Patent: Aug. 12, 2003

(54) PHASE MASK CONSISTING OF AN ARRAY OF MULTIPLE DIFFRACTIVE ELEMENTS FOR SIMULTANEOUS ACCURATE FABRICATION OF LARGE ARRAYS OF OPTICAL COUPLERS AND METHOD FOR MAKING SAME

(75) Inventors: Thomas K. Gaylord, Atlanta, GA (US); Elias N. Glytsis, Atlanta, GA (US); James D. Meindl, Marietta, GA (US)

(73) Assignee: Georgia Tech Research Corp., Atlanta, GA (US)

(*) Notice: Subject to any disclaimer, the term of this patent is extended or adjusted under 35 U.S.C. 154(b) by 0 days.

(21) Appl. No.: 09/848,935

(22) Filed: May 3, 2001

(65) Prior Publication Data

US 2001/0051021 A1 Dec. 13, 2001

Related U.S. Application Data

(60) Provisional application No. 60/201,639, filed on May 3, 2000.

(51) Int. Cl.[7] .............................. G02B 6/34; G03H 1/26
(52) U.S. Cl. ........................................... 385/37; 359/12
(58) Field of Search .................... 385/37, 129; 359/12

(56) References Cited

U.S. PATENT DOCUMENTS

| | | | | |
|---|---|---|---|---|
| 4,942,112 A | * | 7/1990 | Monroe et al. | 430/1 |
| 5,029,154 A | * | 7/1991 | Sumi et al. | 250/201.5 |
| 5,313,538 A | * | 5/1994 | Sansonetti | 385/28 |
| 5,363,226 A | * | 11/1994 | Strasser et al. | 359/566 |
| 5,377,288 A | * | 12/1994 | Kashyap et al. | 359/566 |
| 5,714,750 A | * | 2/1998 | Eastman et al. | 235/462.34 |
| 5,760,960 A | * | 6/1998 | Lin et al. | 359/34 |
| 5,982,545 A | * | 11/1999 | Su | 359/569 |
| 6,285,813 B1 | * | 9/2001 | Schultz et al. | 359/575 |
| 2001/0022880 A1 | * | 9/2001 | Jang | 385/37 |

FOREIGN PATENT DOCUMENTS

| | | | | |
|---|---|---|---|---|
| JP | 57142608 A | * | 9/1982 | G02B/7/26 |
| JP | 01010203 A | * | 1/1989 | G02B/6/12 |

OTHER PUBLICATIONS

Castagnolo, B., Xu, Z. "A new chirped grating for deflecting and focusing guided waves" Electrotechnical Conference, 1996. MELECON '96., 8th Mediterranean, vol. 3, 1996, pp 1521–1524.*

Lee, Kyung et. al. "Spiral fiber gratings for mode coupling" Optical Society of America 2000 MC3–1.*

"Volume Grating Preferential—Order Focusing Waveguide Coupler", Stephen M. Schultz, Elias N. Glytsis, and Thomas K. Gaylord; *Optics Letters*/vol. 24, No. 23/Dec. 1, 1999.

"Design of a High–Efficiency Volume Grating Coupler for Line Focusing", Stephen M. Schultz, Elias N. Glytsis, and Thomas K. Gaylord; *Applied Optics*/vol. 37, No. 12/ Apr. 20, 1998.

"Design, Fabrication, and performance of Preferential—Order Volume Grating Waveguide Couplers", Stephen M. Schultz, Elias N. Glytsis, and Thomas K. Gaylord; *Applied Optics*/vol. 39, No. 8/ Mar. 20, 2000.

* cited by examiner

*Primary Examiner*—Robert H. Kim
*Assistant Examiner*—Krystyna Suchecki
(74) *Attorney, Agent, or Firm*—Thomas, Kayden Horstemeyer & Risley LLP; Todd Deveau (57) ABSTRACT

The present invention entails a phase mask for producing a plurality of volume gratings for use as optical couplers and method for creating the phase mask. The phase mask is produced by creating a plurality of volume gratings having predetermined characteristics which allow the phase mask, when excited by a coherent light wave, to produce a plurality of volume gratings in a recording material.

28 Claims, 6 Drawing Sheets

PHASE MASK CONSISTING OF AN ARRAY OF MULTIPLE DIFFRACTIVE ELEMENTS FOR SIMULTANEOUS ACCURATE FABRICATION OF LARGE ARRAYS OF OPTICAL COUPLERS AND METHOD FOR MAKING SAME

CROSS REFERENCE TO RELATED APPLICATION AND CLAIM OF BENEFIT

This application claims the benefit of co-pending United States Provisional patent application entitled "Phase Mask Consisting of an Array of Multiple Diffractive Elements for Simultaneous Accurate Fabrication of Large Arrays of Optical Couplers" filed on May 3, 2000 and assigned Ser. No. 60/201,639, which is incorporated by reference in its entirety as if fully set forth herein.

TECHNICAL FIELD

This application relates to the field of optical coupling, and more particularly, to the field of diffractive grating in-coupling and out-coupling of guided optical waves.

BACKGROUND INFORMATION

Current communications systems are being stressed due to the ever increasing demand for greater bandwidth to handle evolving communications needs. More and more, telecommunications systems are evolving to meet these needs by employing optical signaling systems which employ optical fiber and specialized optical circuits and components.

The creation of such optical components has become a time consuming and expensive proposition. The optical fibers and optical circuits manufactured today are microscopic in size, where typical optical waveguides feature a cross-section of but a few microns in diameter.

Due to the size of optical waveguides and optical circuitry and other factors, current processes employed in their manufacture can be very costly and labor intensive.

With regard to particular components employed to couple a guided wave from one optical waveguide to a detector or another waveguide, or to couple a light source to a waveguide, this is especially the case. In these couplers, oftentimes a lens is employed to focus the exiting light so as to allow the light to enter a second waveguide without obstruction or loss. Positioning of such a lens is quite labor intensive, as are the subsequent steps of packaging the overall device, translating into a very high cost. This high cost impedes the overall creation of optical communications systems. Consequently, there is a need for a system and method for producing differactive couplers simply, thereby allowing such components to be manufactured at significantly reduced cost with low labor requirements.

BRIEF SUMMARY OF THE INVENTION

The present invention solves the above-described problems by providing a phase mask for creating multiple diffraction gratings simultaneously. As described in U.S. patent application Ser. No. 09/165,822, a diffraction grating can be created to be used as an optical coupler. The present invention provides a phase mask incorporating multiple diffraction gratings for simultaneous production of multiple diffractive optical couplers. The present invention allows the optical couplers described in U.S. patent application Ser. No. 09/165,822 to be produced in large quantities while significantly reducing the cost and labor required.

The phase mask is produced by creating a plurality of diffraction gratings using the method disclosed in Ser. No. 09/165,822. The method disclosed in Ser. No. 09/165,822 teaches splitting a coherent light beam into a first coherent light beam and a second light beam. The first coherent light beam is directed into a first lens and onto an optical component, such as a prism. The second coherent light beam is directed into a second lens and onto the optical component. The optical component optically transmits the first and second coherent light beams into a recording material to create a grating.

Using that method, the phase mask can be designed to produce a plurality of volume gratings on a recording material. In one embodiment, the phase mask uses a pair of volume gratings to produce an interference pattern to create a third volume grating on the recording material. In another embodiment, the phase mask can incorporate multiple volume gratings to simultaneously create multiple third volume gratings on the recording material.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
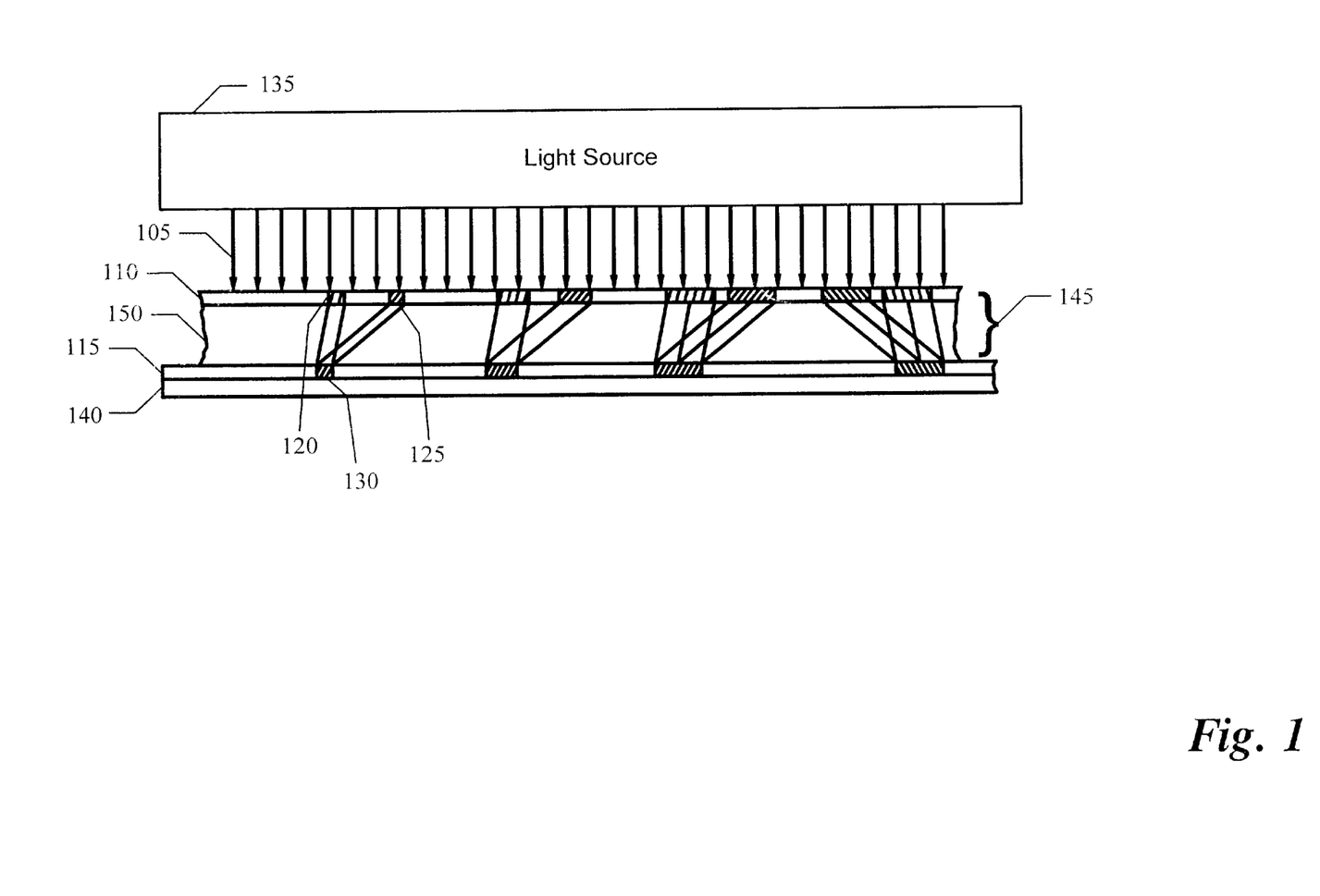
FIG. 1 is an illustration of an exemplary embodiment of the present invention in its operating environment.

FIG. 1 is an illustration of an exemplary embodiment of the present invention in its operating environment. In this embodiment of the present invention, the phase mask may be used to simultaneously create a plurality of diffraction gratings to be used as optical couplers.

FIG. 1 shows a phase mask 145 comprising a substrate 150 and a recording material 110 containing a plurality of volume gratings 120, 125 or essentially equivalent surface-relief gratings. The volume gratings 120, 125 or essentially equivalent surface-relief gratings have predetermined characteristics to diffract light 105 emitted from a light source 135 to a predetermined focus region on a second recording material 115 disposed on a second substrate 140. In an exemplary embodiment of the present invention, the focus region may be a point, a line, a diffraction limited spot, or a multidimensional region, including a plane. A diffraction limited spot is the smallest spot of focus for a given diameter lens system. In an exemplary embodiment of the present invention, the light 105 emitted from the light source 135 is coherent light, such as laser light.

The volume gratings 120, 125 or essentially equivalent surface-relief gratings are designed to diffract light propagating in a specific light propagation direction. In an exemplary embodiment of the present invention, each volume grating 120, 125 or essentially equivalent surface-relief grating is designed to receive light 105 at an angle of incidence that is substantially perpendicular to the planar surface of the phase mask 145 on which the volume grating 120 or essentially equivalent surface-relief grating is disposed. The method for designing a grating with predetermined characteristics is described in U.S. patent application Ser. No. 09/165,822. U.S. patent application Ser. No. 09/165,822 is hereby incorporated by reference in its entirety as if fully set forth herein.

In an exemplary embodiment of the present invention, each volume grating 120, 125 or essentially equivalent surface-relief grating created on the phase mask 145 has a predetermined surface grating pattern having a surface grating period varying along the length of the volume grating 120, 125 or essentially equivalent surface-relief grating, and a plurality of slanted grating fringes having a variable slant angle along the length of the grating 120. Additionally, the predetermined surface grating pattern may include a varying radius of curvature along the length of the grating 120, 125.

The recording material 110, 115 may be, but is not limited to, a photosensitive recording material such as a photo-refractive crystal material or an organic volume phase holographic material, or other suitable material known in the art.

In an exemplary embodiment of the present invention, the substrate 150 is glass such as fused silica, BK-7, or other similar glasses. Alternatively, the substrate 150 may be any material suitable for use in a phase mask for propagating light through the phase mask.

The first and second volume gratings 120 and 125, or essentially equivalent surface-relief gratings, create an interference pattern on the second recording material 115 to create a third volume grating 130 when they are excited by a coherent light wave.

Figure 2:
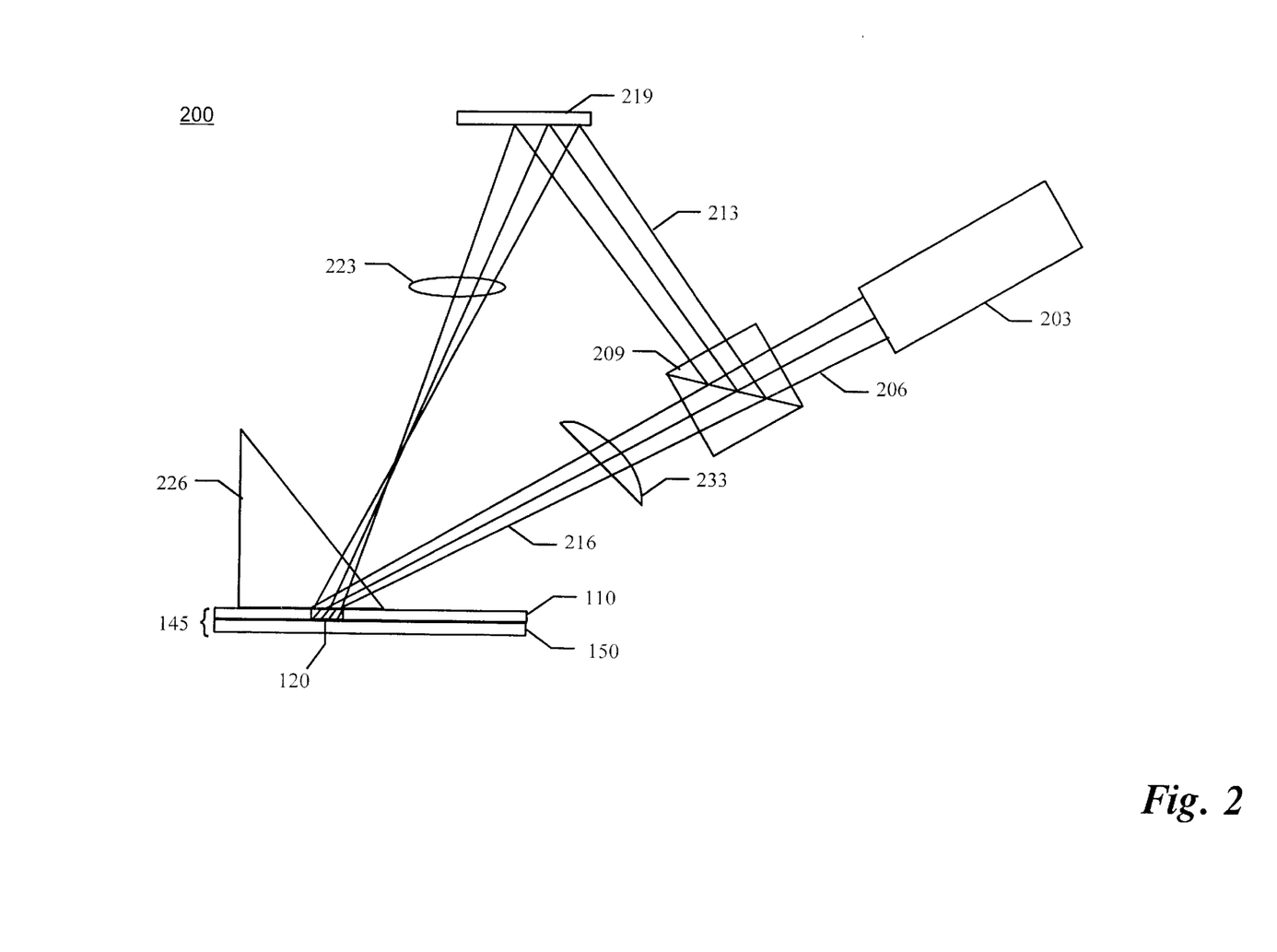
FIG. 2 is an illustration of an exemplary embodiment of a volume grating fabrication system for creating volume gratings on a phase mask.

FIG. 2 is an illustration of an exemplary embodiment of a volume grating fabrication system for creating volume gratings on a phase mask. The volume grating fabrication system 200 may be used to create a phase mask 145. Alternatively, the volume grating fabrication system 200 may be used to individually create volume gratings for use in other devices. The volume grating fabrication system 200 is also described in U.S. patent application Ser. No. 09/165,822.

FIG. 2 shows a volume grating fabrication system 200 comprising a laser 203 which emits a coherent light source, laser beam 206, two lenses 223 and 233, and an optical component 226. The source laser beam 206 is directed into a beam splitter 209, which splits the source laser beam 206 into a first laser beam 213 and a second laser beam 216, the first and second laser beams 213 and 216 being mutually coherent. Alternatively, two distinct mutually coherent lasers could be used instead of splitting the source laser beam 206 into a first and second laser beam 213 and 216. Alternatively, any coherent light source may be used in place of the laser beam.

In an exemplary embodiment of the present invention, a mirror 219 directs the first laser beam 213 into a first lens 223 and onto an optical component 226, such as a prism. The second laser beam 216 propagates straight through the beam splitter 209 into a second lens 233 and onto the optical component 226. The optical component 226 may be, for example, a prism or other optical coupling device. The optical component 226 optically transmits the first and second laser beams 213 and 216 into a recording material 110 which, for example, rests on a substrate 150. The recording material 110 may be, for example, a photosensitive recording material such as a photo-refractive crystal material or an organic volume phase holographic material, or other suitable material known in the art. An optical coupling solution (not shown) may be employed between the optical component 226 and the recording material 110 to facilitate the optical transmission of the first and second laser beams 213 and 216 from the optical component 226 to the recording material 110.

Together the first and second lenses 223 and 233 with the optical component 226 create an interference pattern at the position of incidence of the light on the recording material 110. The precise shape, focal length, and positioning of the first and second lenses 223 and 233 to achieve this interference pattern is determined as discussed in U.S. patent application Ser. No. 09/165,822. In this example, the first lens 223 has an increased positive spherical aberration, and the second lens 233 has a minimized positive spherical aberration, although other lens configurations may be employed. Using the recording system 200 with ultraviolet light or other suitable wavelength, a predetermined volume grating is created in the phase mask 145 by subjecting the recording material 110 to the interference pattern as shown. Thereafter, the recording material 110 is subjected to uniform ultraviolet light to ensure that all polymers in the recording material 110 are cross-linked in the exposed recording material 110.

The article "Design of a high-efficiency volume grating coupler for line focusing" by Stephen M. Schultz, Elias N. Glytsis, and Thomas Gaylord (Applied Optics, vol. 37, no. 12, page 2278, Apr. 20, 1998) is hereby incorporated by reference in its entirety as if fully set forth herein. This article describes in detail how to design and optimize a volume grating for outcoupling and line focusing of waveguided infrared light and the desired interference pattern to produce the grating.

The article "Volume grating preferential-order focusing waveguide coupler" by Stephen M. Schultz, Elias N. Glytsis, and Thomas Gaylord (Optics Letters, vol. 24, no. 23, page 1708, Dec. 1, 1999) is hereby incorporated by reference in its entirety as if fully set forth herein. This article describes in detail how to fabricate and test a volume grating focusing waveguide coupler.

The article "Design, fabrication, and performance of preferential-order volume grating waveguide couplers" by Stephen M. Schultz, Elias N. Glytsis, and Thomas Gaylord (Applied Optics, vol. 39, no. 8, page 1223, Mar. 10, 2000) is hereby incorporated by reference in its entirety as if fully set forth herein. This article describes in detail how to design, fabricate, and test both nonfocusing and focusing preferential-order volume grating waveguide couplers.

Figure 3A:
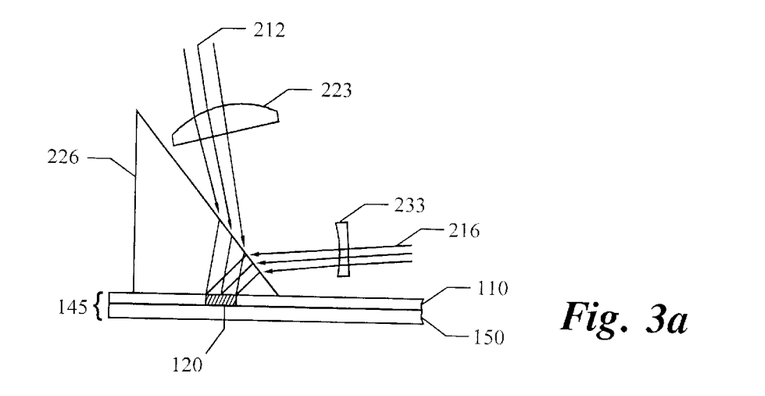
FIGS. 3a–3c illustrate an exemplary method of creating a plurality of volume gratings on a phase mask.
Figure 3B:
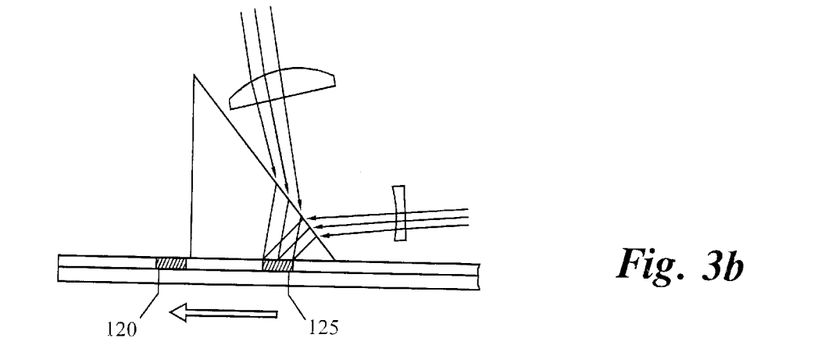
Figure 3C:
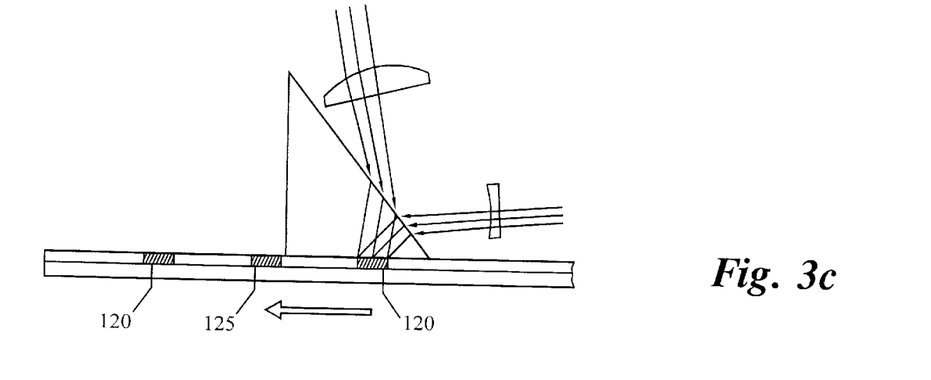

FIGS. 3a–3c illustrate an exemplary method of creating a plurality of volume gratings on a phase mask. Once such a phase mask 145 is created, it may be used to simultaneously create numerous volume gratings on a circuit board or substrate. Additionally, a phase mask 145 may be designed to be used to create more phase masks. An original phase mask 145 may be created using the volume grating fabrication system 200 described in FIG. 2. In order to create a phase mask 145, a plurality of volume gratings 120 and 125 or essentially equivalent surface-relief gratings must be created. FIGS. 3a, b, and c show the volume grating fabrication system 200 placed in three different positions to create three different volume gratings 120, 125 on the recording material 110 of the mask. The volume grating or essentially equivalent surface-relief grating fabrication system 200 can be used to create gratings 120, 125 having predetermined characteristics at predetermined locations. The method for determining the characteristics needed in the grating 120, 125 and the method for creating the gratings 120, 125 are described in U.S. patent application Ser. No. 09/165,822.

Figure 4:
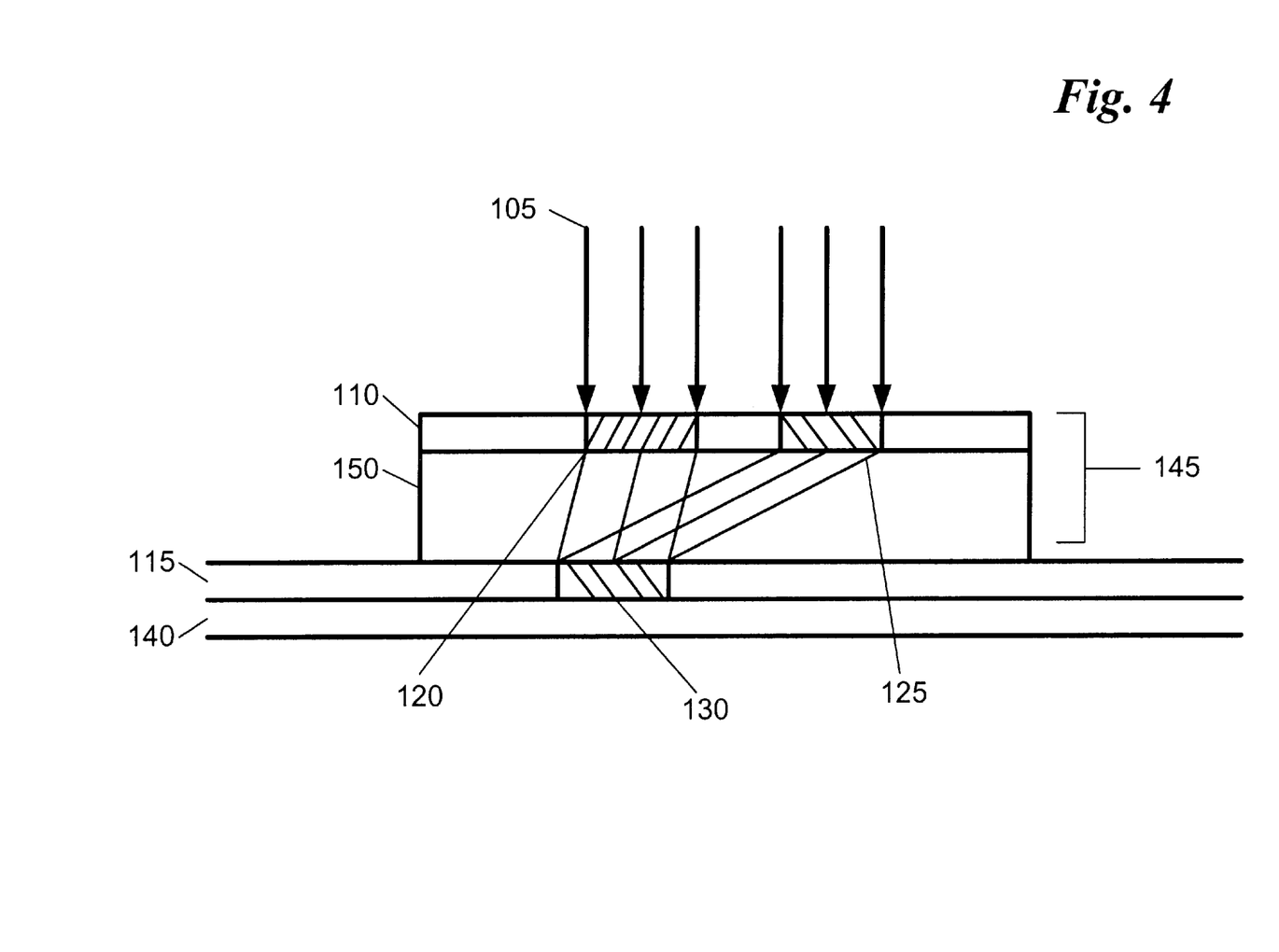
FIG. 4 is an illustration of an exemplary embodiment of a phase mask for creating a single volume grating.

FIG. 4 is an illustration of an exemplary embodiment of a phase mask 145 for creating a single volume grating 130. The operation of the phase mask 145 is similar to the operation of the volume grating fabrication system 200 except, however, the phase mask 145 uses first and second volume gratings 120 and 125 or essentially equivalent surface-relief gratings to replace the first and second lenses 223 and 233. On the phase mask 145, the first and second gratings 120 and 125 focus two separate beams of light to a given location on a second recording material 115 to create an interference pattern at the position of light incident on the recording material 115 where a volume grating or essentially equivalent surface-relief gratings 130 is desired. Using the phase mask 145, the third volume grating or essentially equivalent surface-relief grating 130 thus is created by subjecting recording material 115 to an interference pattern created by transmitting light through the first and second gratings 120 and 125 of the phase mask.

Figure 5:
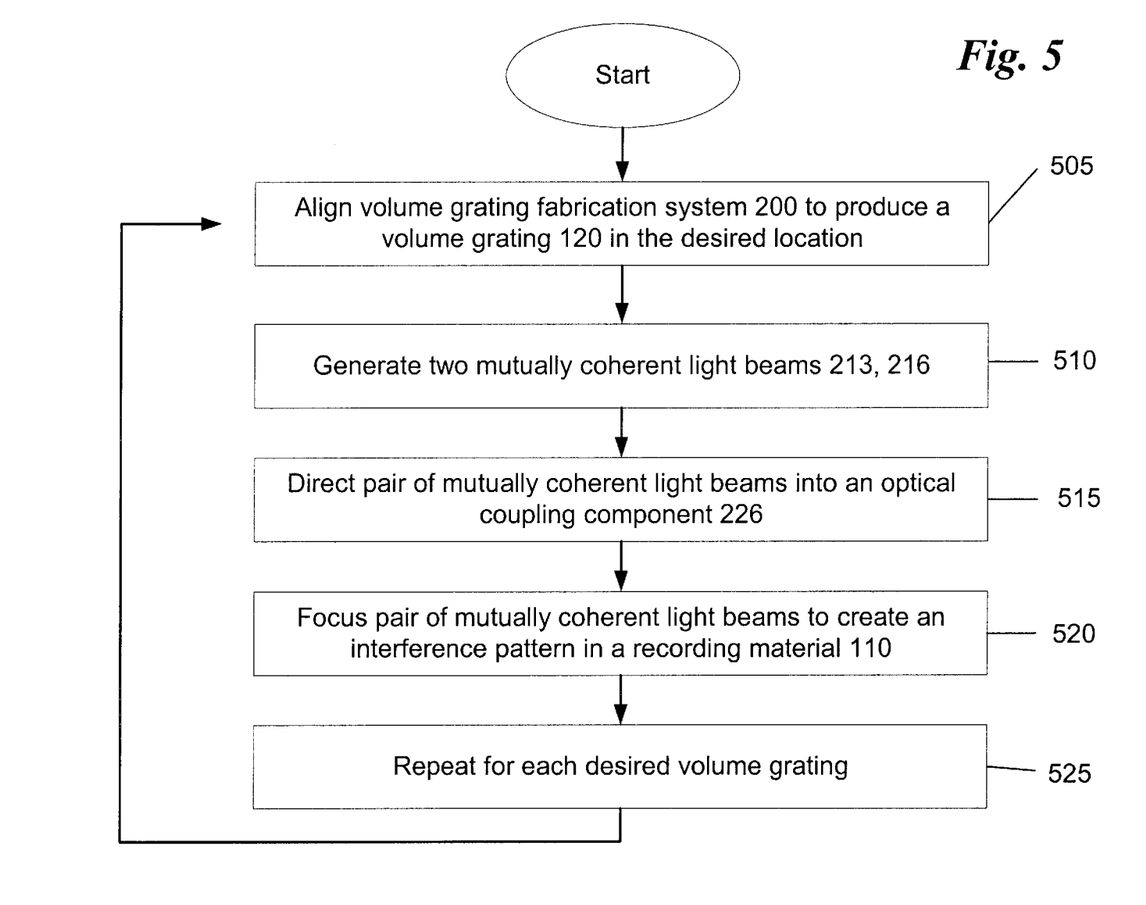
FIG. 5 is a flow diagram illustrating an exemplary implementation of a method for making a phase mask.

FIG. 5 is a flow diagram illustrating an exemplary implementation of a method for making a phase mask. A phase mask 145 may be made using a volume grating fabrication system 200 using the method described in FIG. 5. In an exemplary embodiment of the present invention, a phase mask 145 is created using a substrate capable of passing light waves and a recording material 110 for creating a volume grating 120.

In an exemplary embodiment of the present invention, the phase mask 145 is created by first aligning the volume grating fabrication system 200 to produce a predetermined volume grating 120 or essentially equivalent surface-relief grating in a desired location 505. Once the volume grating fabrication system 200 is properly aligned, two mutually coherent light beams are generated 510. The two mutually coherent light beams may be generated separately, or by splitting a light beam into two light beams. In an exemplary embodiment of the present invention, the mutually coherent light beams are lasers.

The pair of mutually coherent light beams are directed 515 into an optical component to transmit the light beams into the recording material 110. The optical component 226 may be, but is not limited to, a prism. Alternatively, any device capable of transmitting the coherent light beams to the recording material 110 of the mask 145 may be used. When the two light beams are directed through the optical component 226 to the recording material 110, the two light beams combine to create an interference pattern on the recording material 110 of the mask 145 at a focus region creating a grating 120.

The mutually coherent light beams are focused through two lenses 223 and 233 to create an interference pattern 520. The interference pattern is designed to create the predetermined volume grating or essentially equivalent surface-relief grating 120 in the recording material 110 of the phase mask 145.

These steps are repeated for each additional desired grating 120 to be created in the phase mask 145. A phase mask 145 may have one grating, but typically has numerous gratings 120. In an exemplary embodiment of the present invention, a pair of two volume gratings 120, 125 or essentially equivalent surface-relief gratings is created on the phase mask 145 for each grating 130 desired to be created by the phase mask 145. Alternatively, more than two volume gratings 120, 125 or essentially equivalent surface-relief gratings could be used to create each grating 130.

Figure 6:
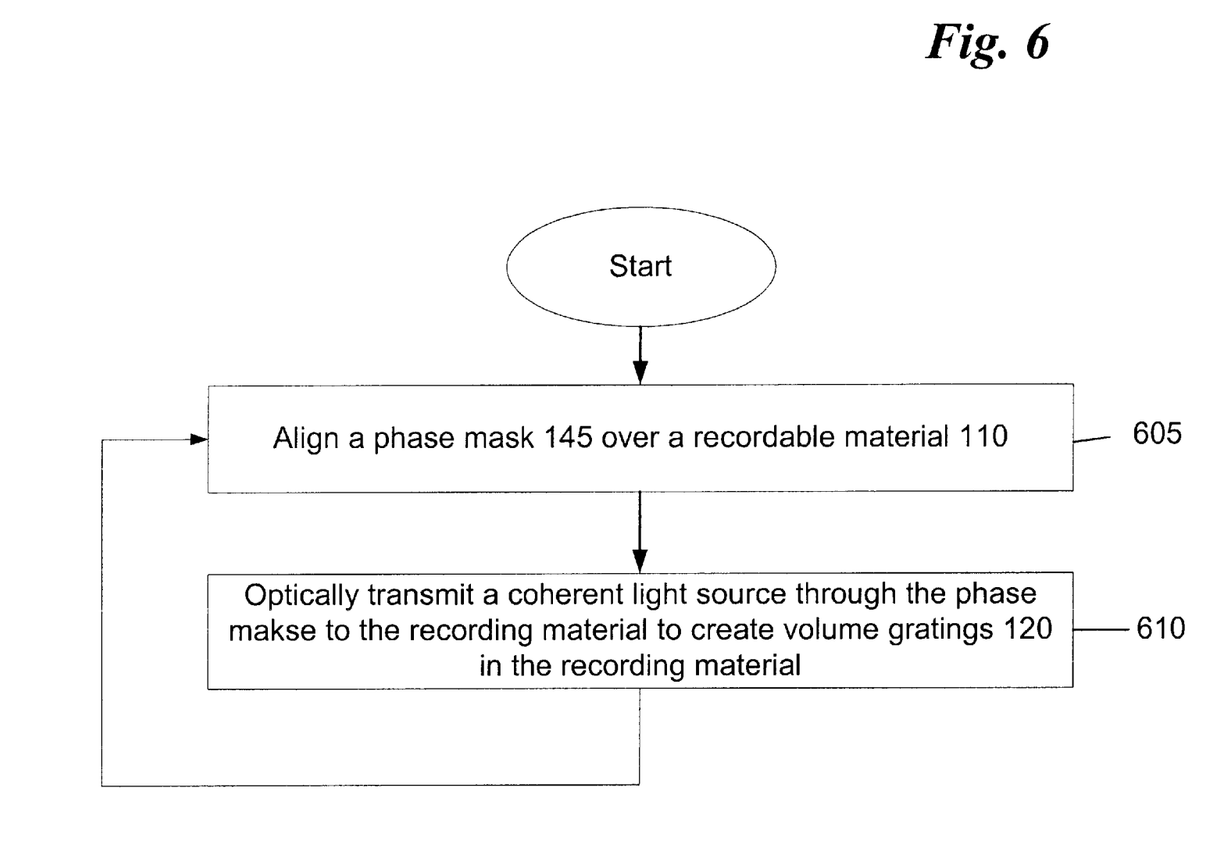
FIG. 6 is a flow diagram illustrating an exemplary implementation of a method for making a plurality of volume gratings using a phase mask.

FIG. 6 is a flow diagram illustrating an exemplary implementation of a method for making a plurality of volume gratings using a phase mask. In an exemplary embodiment of the present invention, a phase mask 145 is used to create a plurality of volume gratings 130 or essentially equivalent surface-relief gratings. The plurality of volume gratings 130 may be created using the method described in FIG. 6. Typically, the gratings 130 are created on a microelectronic integrated circuit or a substrate or a printed wiring board. In an exemplary embodiment of the present invention, the gratings 130 are used as optical couplers to couple light from a waveguide into a microelectronic integrated circuit. To create the gratings 130, the phase mask 145 is aligned over recording material 115 on which the gratings 130 are to be created. Typically, the recording material 115 is coated on a microelectronic integrated circuit.

Once the phase mask 145 is aligned over the recording material 115, a coherent light produced by a light source is optically coupled through the phase mask 145 to the recording material 115 to create gratings 130 in the recording material 115. Using this method, a plurality of volume gratings 130 or essentially equivalent surface-relief gratings may be created substantially simultaneously as the light is coupled to the recording material 115.

The method of FIG. 6 may be used to mass produce circuit boards containing optical couplers inexpensively and in great quantity. This is made possible because many optical couplers may be created at one time without repositioning the a device to create each volume grating 130 or essentially equivalent surface-relief grating.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, we claim:

1. An apparatus for producing an optical coupler comprising:
   a phase mask;
   recording material; and
   a grating pair of the phase mask including
      a first grating for diffracting light towards a focus region on the recording material; and
      a second grating for diffracting light towards said focus region on the recording material;
   the grating pair having a period that continuously varies over the surface of the gratings; and
   the diffracting light from the grating pair intersecting and interfering such that the interference pattern forms an optical coupler.

2. The apparatus of claim 1, wherein said first and second gratings are selected from volume gratings and surface-relief gratings.

3. The apparatus of claim 1, wherein said first grating has a first predetermined surface grating pattern comprising a varying radius of curvature along a surface direction.

4. The apparatus of claim 1, wherein said first grating is formed from a photo-refractive material.

5. The apparatus of claim 1, wherein said first grating is formed from an organic volume holographic material.

6. An apparatus for producing an optical coupler comprising:
a phase mask;
a recording material; and
a grating pair of the phase mask including
a first grating for diffracting light at a first predetermined angle of diffraction, the first grating having a non-constant period; and
a second grating for diffracting light at a second predetermined angle of diffraction; and
wherein said light diffracted by said first grating and said light diffracted by said second grating are directed to intersect at a predetermined intersection region of the recording material to form a recorded grating such that the interference pattern forms an optical coupler; and
wherein the grating pair has a general non-constant-period.

7. The apparatus of claim 6, wherein said gratings are selected from volume gratings and surface-relief gratings.

8. The apparatus of claim 6, further comprising diffracting means that diffracts said light to a line in the intersection region.

9. The apparatus of claim 6, further comprising diffracting means that diffracts said light to a diffraction limited spot in the intersection region.

10. The apparatus of claim 6, wherein said gratings are volume gratings for diffracting light at predetermined angles of diffraction, and further comprising diffracting means that diffracts said light in a predetermined pattern in the intersection region.

11. The apparatus of claim 10, wherein at least one of said volume gratings comprises a first predetermined surface grating pattern having a first surface grating period varying along the length of said first volume grating, and a plurality of slanted grating fringes having a first variable slant angle along the length of said volume grating.

12. The apparatus of claim 11, wherein said predetermined surface grating pattern further includes a varying radius of curvature along said length of said volume grating.

13. A system for creating a grating for use as an optical coupler, comprising:
a light source for generating a light wave;
phase mask having a first grating configured to optically couple said light wave to a recording material, the first grating having a non-constant period, and a second grating configured to optically couple said light wave to said recording material, the second grating having a non-constant period; and
wherein said first and second gratings are configured to focus said light wave to create an interference pattern in said recording material, the interference pattern forming an optical coupler.

14. The system of claim 13, wherein said gratings are selected from volume gratings and surface-relief gratings.

15. The system of claim 13, wherein said interference pattern is characterized by a cross-section having a varying period along a waveguide light propagation direction, and a plurality of slanted fringes having a variable slant angle along said waveguide light propagation direction.

16. The system of claim 15, wherein said interference pattern is further characterized by a varying radius of curvature along said waveguide light propagation direction.

17. A method for creating a grating for use as an optical coupler, the method comprising the steps of:
generating a coherent light beam;
directing said coherent light beam into a phase mask having at least two gratings, at least one of said gratings of the phase mask having a non-constant period, said phase mask configured to optically couple a pair of coherent light beams to a recording material; and
focusing said coherent light beams to create an interference pattern in said recording material to form an optical coupler.

18. The method of claim 17, wherein the interference pattern produces a plurality of gratings.

19. The method of claim 18, wherein the plurality of gratings are produced substantially simultaneously.

20. The method of claim 17, wherein said interference pattern is characterized by a cross-section having a varying surface period along a waveguide light propagation direction, and a plurality of slanted fringes having a variable slant angle along said waveguide light propagation direction.

21. The method of claim 20, further comprising the step of focusing the coherent light beam creating the interference pattern, wherein the cross-section of the interference pattern is further characterized by a varying radius of curvature along the waveguide light propagation direction.

22. An apparatus for producing an optical coupler comprising:
a phase mask having a continuously varying period and a continuously varying periodicity direction over the entire surface of the phase mask;
a recording material; and
a grating pair of the phase mask including
a first grating for diffracting light towards a focus region on the recording material; and
a second grating for diffracting light towards the focus region on the recording material;
the diffracting light from the grating pair intersecting and interfering to form a recorded grating such that the interference pattern forms an optical coupler.

23. The apparatus of claim 22, wherein the plurality of gratings are produced substantially simultaneously.

24. The apparatus of claim 22, further comprising diffracting means that diffracts said light to a line in the intersection region.

25. The apparatus of claim 22, further comprising diffracting means that diffracts said light to a diffraction limited spot in the intersection region.

26. The apparatus of claim 22, wherein said gratings are volume gratings for diffracting light at predetermined angles of diffraction, and further comprising diffracting means that diffracts said light in a predetermined pattern in the intersection region.

27. An apparatus for producing an optical coupler comprising:
a phase mask;
a recording material; and
a grating pair of the phase mask including
a first grating for diffracting light towards a focus region on the recording material, the first grating having a non-constant period; and
a second grating for diffracting light towards the focus region on the recording material, the second grating having a non-constant period;
the grating pair diffracting light into a general arbitrary-profile light beam; and
the diffracting light from the grating pair intersecting and interfering such that the interference pattern forms an optical coupler.

28. The apparatus of claim 27, wherein the plurality of gratings are produced substantially simultaneously.

* * * * *